Jan. 12, 1965  D. OEHLERKING  3,165,013
CABLE STRIPPER
Filed Feb. 1, 1963  2 Sheets-Sheet 1
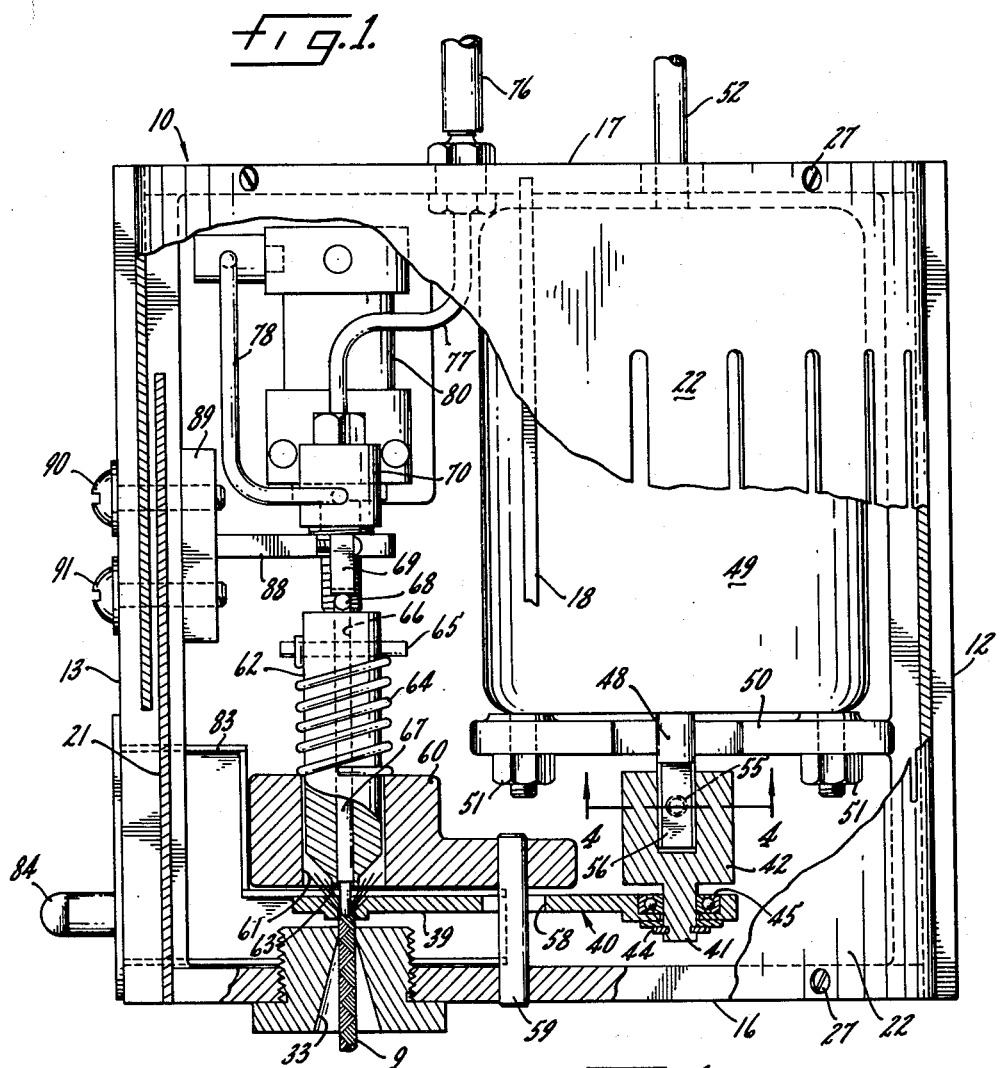
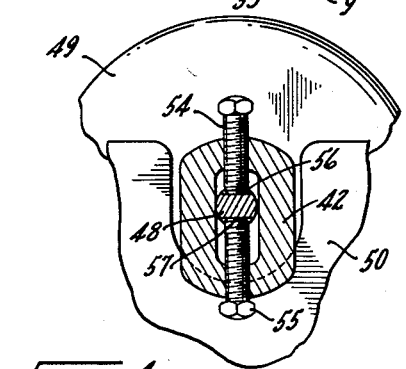
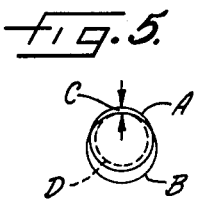
INVENTOR.
Dean Oehlerking,
BY Parker & Carter
Attorneys.

Jan. 12, 1965  D. OEHLERKING  3,165,013
CABLE STRIPPER
Filed Feb. 1, 1963  2 Sheets-Sheet 2

INVENTOR.
Dean Oehlerking,
BY Parker & Carter
Attorneys.

3,165,013
CABLE STRIPPER

Dean Oehlerking, Sycamore, Ill., assignor to Ideal Industries, Inc., Sycamore, Ill., a corporation of Illinois
Filed Feb. 1, 1963, Ser. No. 255,630
11 Claims. (Cl. 81—9.51)

This invention relates to a method and apparatus for stripping coaxial cables, and particularly relates to a method of spreading the braid cover in the shape of a cone and then cutting the cover close to the cable.

A primary object of this invention is a method and apparatus which eliminates the problems of stripping the braid cover attached to the conductor by spacing the cover away from the conductor before it is cut.

Another object is a method and apparatus for removing braid cover from cable without scraping or otherwise damaging the inner insulation and conductor.

Another object is a method and apparatus having adjustable features to remove different lengths of braid cover.

Another object is a method and apparatus in which cutting means may be automatically triggered to neatly cut a braid cover from the inside of the cover.

Another object is a method of flaring insulation on an insulated wire so that it can be cut or removed.

Another object is a method of gyratorially upsetting or indenting or severing the insulation on an insulated wire so that it can be removed.

Another object is a method of applying gyratory pressure to the exterior of a coaxial cable of an intensity such that the braid on the outside will take a permanent set, but the insulation between the braid and the conductor will recover after being initially deformed.

Another object is a method of rope whipping the end of an insulated wire to centrifugally spread the insulation.

Another object is a method of repeatedly stressing the insulation on wire by the use of gyratory pressure to break down or eventually rupture the insulation.

Figure 2:
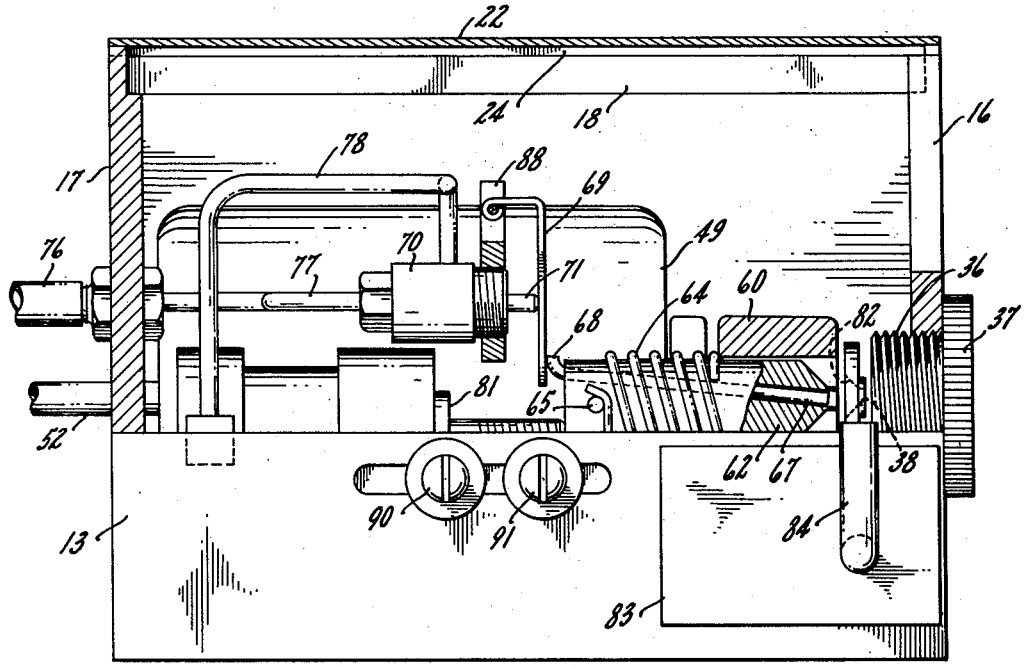
Figure 3:
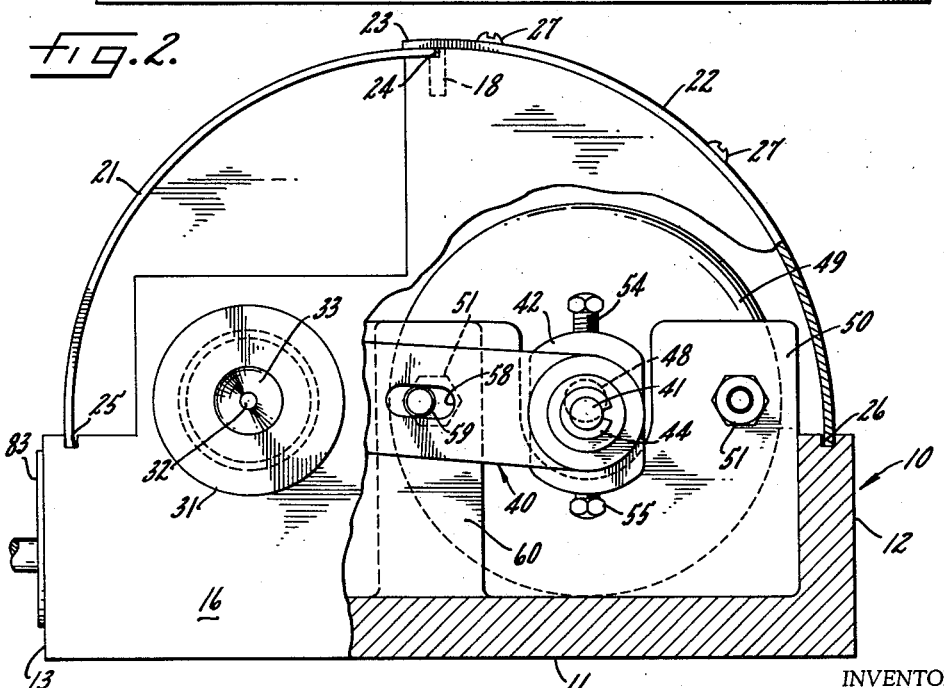

The foregoing objects are realized along with other objects which will be apparent from reading the specification and the claims of the present invention. Reference will be made to the accompanying drawings wherein:

FIGURE 1 is a top plan of the stripper assembly with parts removed and parts in section, FIGURE 2 is a side elevational view with parts removed and parts in section, FIGURE 3 is a front elevational view with parts removed and parts in section, FIGURE 4 is a view along line 4—4 of FIGURE 1, and FIGURE 5 is a diagrammatic front view showing the relationship of the openings in the guide and the gyrating arm.

Like numerals will refer to like parts, concepts and structures throughout the specification.

A cut end of a coaxial cable 9 is shown as inserted in a housing which has a base generally shown as 10. The base has a floor 11 and opposed short side walls such as 12 and 13. The details of the housing may be better seen in FIGURES 2 and 3. The housing also has an arcuate front wall 16 and an arcuate rear wall 17. A crossbrace 18 is shown as forming a rabbet joint at its opposed ends in the front and rear walls. Curved roof portions 21 and 22 may overlap as at 23 and be supported at their terminating ends on the crossbrace. The roof portion 21 may have the edge of one side forming a rabbet joint in a longitudinal groove 24 on the crossbrace. The other ends of the curved roof portions may be seated in longitudinal grooves 25 and 26 in the top of the short side walls. The curved roof portion may be secured to the tops of the front and rear walls by screws or the like 27.

A guide member 31 has an aperture 32 surrounded by a cone-shaped recess 33 to hold and guide insertion of a free end of a coaxial cable into the housing. The guide member is mounted in a hole in the front wall by threaded engagement as at 36 and it may also have a knurled head 37 to facilitate adjustable mounting and removal of the guide member in the front wall.

The stripping operation will be better understood by reference to FIGURES 1 and 2. The cable enters a bore 38 in the head 39 of a fluffer shown generally as 40. The other end of the fluffer is rotatively connected to stub 41 of eccentric body 42. A snap ring or the like 44 holds the fluffer arm on a bearing 45 on the stub.

The eccentric is turned by a shaft 48 of a motor 49 which may be driven by electric current from line 52 which may be connected to an appropriate source. The motor is secured to a plate or the like 50 by bolts 51. The plate may be an integral extension of the base or may be secured to the base by welds or the like. The eccentric body may be fixed to the shaft in the manner shown in FIGURE 4. A pair of opposed bolts 54 and 55 may be turned in threaded bores in the eccentric body until they contact opposed milled flats 56 and 57 on the shaft.

The stub will be slightly offset on the eccentric so that the fluffer arm moves in a gyratory path as the eccentric is rotated by the shaft of the motor. The fluffer arm has an opening 58 which pivots and slides on a pin 59 which is anchored at its ends by a press fit in front wall 16 and a block 60. The block 60 may be an integral extension of the base portion or may be attached to the base. It is a stationary member having a passageway 61 which receives a sliding cutter 62 having a forward annular cutting edge 63. The cutter is normally urged away from the block by a coil spring 64 which has one end against the block and the other end anchored to a bar on the like 65. The cutter has a longitudinal bore 66 in which an actuating member or rod 67 is freely and movably located. An upturned end 68 on the rod is positioned close to a handle 69 of an air valve 70. The handle is adjacent a pin 71 which is movably urged towards the handle by means not shown.

After the braid cover has been fluffed or flared away from the inner insulation cover, the end of the cable is moved inwardly so that it pushes the rod which then moves the handle to press the air valve to open position to admit compressed air. The air enters conduit 76, line 77, the air valve 70, line 78, and then enters air cylinder 80. The air exerts a force against ram 81 which moves the cutter forward until the annular cutting edge moves past the base of the cone-shaped braid cover and cuts the cover against the backing surface of the fluffer. The backing surface is a countersunk tapered bore 82 on the head of the fluffer. The cut braid cover will fall into drawer 83 which may be periodically removed with the help of handle 84.

The air valve may be adjustably spaced from the trigger rod by a bracket arm 88 which is fixed to block 89 by screws such as 90, 91. The screws may be loosened and laterally positioned to move the block towards and away from the cutter.

The use and operation of my invention are as follows:

The invention may be viewed as a process of applying pressure to the insulation on an electric wire in a circle around the wire on a cyclical basis, moving at a generally constant rate of speed around the wire, of sufficient intensity to deform or upset or damage the insulation without affecting the wire itself. The action is similar to twirling a hoop around a stick, but in the form shown, the hoop does not rotate, it slips.

In the case of a coaxial cable, a metal sheath or braid is deformed beyond its elastic limit and does not recover, while the insulation under it, though deformed, recovers. The result is that the sheath will be flared out in a cone adjacent the end of the cable. Basically, this is a method of applying pressure on a cyclical basis circumferentially around an insulated wire at a distance spaced somewhat from the end of the wire so that the sheath will be deformed beyond its elastic limit and therefore broken down.

The action is diagrammatically shown in FIGURE 5 in which the hole or opening in the guide is indicated at A with the hole or opening in the fluffer indicated at B. The hole in the fluffer is defined by an annular pressure edge. It will be noted that the two are not coaxial but are on different centers and there is a degree of overlap, as indicated by the opposed arrows at C, so that the pressure edge of the opening B in the fluffer slightly closes or blocks the opening A in the guide, by the amount C. Since the fluffer gyrates, the interference C will move around the stationary guide opening A and, in effect, will tend to close it down to circle D. Since the electric wire to be stripped has an outside diameter on the order of the hole A in the guide, there will be a degree of interference, by the amount C. When the wire is inserted through the hole A, it will strike the fluffer or overlap the fluffer opening B by the amount C. With the fluffer gyrating, the gyrating hole B in the fluffer will walk its way around the end of the wire and will quickly work its way over the end of the wire. With the operator pushing on the cable, the gyrating pressure edge of opening B, the fluffer, will walk on the end of the cable, provided the amount of overlap C is not too great. Since the end of the cable projects beyond the stationary opening in the guide, the end of the cable will be bent or deformed somewhat. But, basically, the overlap C is taken up by compression in the insulation itself. Thus, the insulation will be deformed or compressed in an ever-moving path around the wire. In the case of coaxial cable, the metal sheathing will be depressed sufficiently to take a permanent set and will not recover. The insulation or sleeve under the mesh, however, will recover, and the result is that the end of a sheathing will flare out in a cone.

It has been found difficult to insert the cable with the fluffer stationary, so it is recommended that the fluffer be operating when the cable is inserted. At the same time that the metal sheathing is being deformed or permanently set by the orbiting compression, the deflecting end of the cable will also be rope whipped and a degree of centrifugal force will cause the cable sheathing to flare out too. But, basically, the repeated stressing caused by the orbiting interference C is the factor that causes the braid to flare.

In the cutting action, the edge of the cutter moves in against the conical surface on the rear of the fluffer, and depending upon the degree of eccentricity applied to the fluffer by the adjustment 54, the cutter edge will move a greater or lesser distance in before it hits the conical surface. But, in any event, the cutting action is self-regulating and the braid will be caught between the outer edge of the cutter and the conical rear surface of the fluffer. Again, as the fluffer gyrates, it will move around the cutting edge and the braid will be severed by a gyratory or orbital cutting action.

For different size wires, the guide 33 may be changed and eccentricity adjusted at 54.

The opening in the fluffer has been shown as including, first, a generally straight cylindrical section with a cone or flared out portion behind it, and it should be understood that the invention is not restricted to any particular shape of passage through the fluffer. In fact, in certain situations, the passage through the fluffer might have a circumferential knife edge which, in addition to stressing or indenting the braid or insulation, might actually cut through it, and a suitable tensioning mechanism could be used to pull the partially severed slug off of the end of the wire.

In certain situations, one might use a compound motion which would involve more than one fluffer. For example, one could have two fluffers, but 180 degrees out of phase, moving in either the same or opposite direction. Or one might have three, the two on the outside being synchronized and the one in the middle being 180 degrees out of phase. In any event, the result would be that the insulation would be broken down due to the cyclical stresses, and a cutter might or might not be necessary, dependent upon the particular type of insulation on which the device is working. However, a single fluffer is the preferred form due to simplicity. While reference has been made to a fluffer, it should be understood that it is, in reality, a cyclical hammer which applies a continuous series of circumferential deforming blows to the insulation. The rope whipping action that the name fluffer implies is, to a degree, secondary. At the same time, it should be understood that the rope whipping action may be used in and of itself, but the process is much more efficient if the repeated stresses are applied to the insulation.

The cover may be automatically cut by advancing the exposed cable with the inner insulation into an aperture formed by an annular cutting edge 63 of a cutter 62. The tip of the cable will move actuating rod 67 to move handle 69 and pin 71. This will open the air valve 70 so that compressed air from an outside source may actuate a valve cylinder 80. This valve cylinder will move the cutter past the base of the cone and towards the apex, as it were. The cutter will move against the tapered bore of the head of the fluffer and cut the braided cone. After the cutter advances, the handle will be removed from the pin and the valve will close off the compressed air so that the action of the spring 64 on the cutter will urge the cutter out of cutting position. The cut braid cover will then fall into drawer 83, and this drawer may be periodically removed to empty the accumulated severed slugs.

This process permits the braid cover to be quickly removed without damaging the inner insulation or conductor of the coaxial cable. The process and apparatus permits a great deal of flexibility and adjustability so that various lengths of the braided cover may be removed and different speeds may be used to remove the cover at different periods of time. It will be appreciated that different automatic elements may be applied for advancing the cutter in different ways to cut the unraveled braid cover. The head of the fluffer arm may be a separate unit rather than an integral extension of the arm. This may be desired where, for example, different heads having different aperture sizes and tapered bores are needed for coaxial cable of different sizes and the like. The process and the apparatus may be modified so that a plurality of cables may be stripped simultaneously by applying a plurality of fluffer heads on an arm or the like. If desired, the cable may be automatically brought to the guide and then passed through the various steps of the process.

The unit may also be constructed with no eccentricity in the fluffer when the device is idling. But when the operator inserts the cable, it could trip a switch which, through appropriate gearing, would cause a certain amount of eccentricity to be automatically cranked into the adjustment 54 so that the cable would be fully inserted before the stressing started. This type of arrangement might have particular advantage where a circumferential knife edge is used in the fluffer opening.

The foregoing invention can now be practiced by those skilled in the art. Such skilled persons will know that the invention is not necessarily restricted to the particular embodiments herein. The scope of the invention is to be defined by the terms of the following claims as given meaning by the preceding description.

I claim:

1. A method of removing the insulation from an insulated wire which includes the steps of applying pressure to the insulation at a point spaced somewhat from a free end thereof, gyrating the pressure point around the insulation while allowing the portion of the wire between the point of applied pressure and the free end to move freely in a gyratory whipping action, and moving the pressure point around the insulation at a sufficient intensity relative to the characteristics of the insulation such that the insulation will be deformed so that it may be removed from the wire at the free end.

2. A method according to claim 1 further characterized by and including the step of cutting the insulation substantially around the defined or broken portion.

3. The method according to claim 1 further characterized by and including the step of restraining the wire against the movement caused by the gyrating pressure point, said restraining action being adjacent the point of applied pressure and away from the free end of the wire.

4. A method of removing the braid cover from coaxial cable which includes the steps of holding the cable at a distance from a free end, applying pressure to the braid cover at a point adjacent the held position, gyrating the pressure point around the braid cover while allowing the portion of the cable between the point of applied pressure and the free end to move freely in a gyratory whipping action, moving the pressure point around the braid cover at a sufficient intensity relative to the characteristics of the braid cover such that the braid cover will flare away from the cable at the free end, and cutting the braid cover substantially around the pressure point.

5. A stripper for a coaxial cable which includes, in combination, a guide body to receive a free end of the cable, an arm, a tapered bore towards one end of the arm, an aperture defined by a rounded pressure edge in the bottom of the bore to receive one end of the cable from the guide body, and means to move the arm in a gyratory path so that the rounded pressure edge breaks down or deforms the braid cover and flares a portion of the braid cover outwardly.

6. A stripper as in claim 5 further characterized by and including a cutter to sever the flaired braid cover portion.

7. A stripper according to claim 5 further characterized in that the cutter has an annular knife edge surrounding an aperture so that the uncovered cable enters the aperture and the rounded edge cuts the cover against the tapered bore in the gyrating arm.

8. A stripper for a coaxial cable which includes, in combination, a guide body with an aperture to receive a free end of a coaxial cable, a rotatable eccentric, motive means to rotate the eccentric, an arm connected to the eccentric, a second aperture in the arm substantially aligned with the first aperture but having a different center, said second aperture defined by a circular pressure edge, said arm movable in a gyratory path so that the circular pressure edge progressively hammers the braid cover in a circumferential path until a portion of the braid cover flares outwardly to uncover the cable, and a movable cutter with a third aperture to receive the uncovered cable and cut the flared braid cover.

9. A stripper according to claim 8 further characterized by and including means on the eccentric to adjust the sweep of the gyratory movement.

10. A stripper for removing insulation from electric wires which includes, in combination, means to circumferentially apply pressure in gyratory paths to the wires so that the insulation will be broken down or deformed around the electric wire, and a cutter so that the portion of the insulation may be cut approximate to the deformed or broken down insulation.

11. A stripper for removing insulation from electric wires which includes, in combination, a guide body having an aperture to receive and guide a free end of the wire, means to circumferentially apply pressure in a gyratory path to the wire so that the insulation will be broken down or deformed around the electric wire, an aperture in the means for circumferentially applying pressure to the insulation and said aperture on a different center from the guide body aperture.

References Cited in the file of this patent

UNITED STATES PATENTS

| | | |
|---|---|---|
| 878,493 | Barnes | Feb. 11, 1908 |
| 2,452,423 | Bass | Oct. 26, 1948 |
| 2,530,219 | Bartusek | Nov. 14, 1950 |
| 2,657,601 | Bentley | Nov. 3, 1953 |
| 2,765,685 | Stratman et al. | Oct. 9, 1956 |
| 2,873,489 | Hirschhorn | Feb. 17, 1959 |
| 2,891,433 | Ackermann | June 23, 1959 |
| 2,951,403 | Bunch et al. | Sept. 6, 1960 |
| 2,981,129 | Adams | Apr. 25, 1961 |
| 2,988,940 | Folkenroth et al. | June 20, 1961 |